(12) United States Patent
Hebbar et al.

(10) Patent No.: US 9,122,660 B2
(45) Date of Patent: Sep. 1, 2015

(54) PRESENTATION OVERLAYS TO MODIFY PRESENTATIONS OF PACKAGED FILES

(75) Inventors: Vivek Hebbar, Cupertino, CA (US); Jason T. Pittenger, Menlo Park, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 391 days.

(21) Appl. No.: 13/052,829

(22) Filed: Mar. 21, 2011

(65) Prior Publication Data

US 2014/0040720 A1   Feb. 6, 2014

(51) Int. Cl.
*G06F 17/00* (2006.01)
*G06F 17/21* (2006.01)
*G06F 17/22* (2006.01)
*G06F 17/24* (2006.01)

(52) U.S. Cl.
CPC ............ *G06F 17/218* (2013.01); *G06F 17/211* (2013.01); *G06F 17/2205* (2013.01); *G06F 17/24* (2013.01)

(58) Field of Classification Search
CPC .. G06F 17/211; G06F 17/243; G06F 17/3089
USPC ........................................................ 715/234
See application file for complete search history.

(56) References Cited

U.S. PATENT DOCUMENTS

| | | |
|---|---|---|
| 5,706,457 A | 1/1998 | Dwyer et al. |
| 6,237,011 B1 | 5/2001 | Ferguson et al. |
| 6,278,455 B1 | 8/2001 | Baker |
| 6,636,246 B1 | 10/2003 | Gallo et al. |
| 7,013,435 B2 | 3/2006 | Gallo et al. |
| 7,031,968 B2 | 4/2006 | Kremer et al. |
| 7,089,248 B1 | 8/2006 | King et al. |
| 7,139,977 B1 | 11/2006 | Russell |
| 7,412,650 B2 | 8/2008 | Gallo |
| 7,634,775 B2 | 12/2009 | McLuckie et al. |
| 8,677,229 B2 | 3/2014 | McAfee et al. |
| 2002/0073058 A1 | 6/2002 | Kremer et al. |

(Continued)

FOREIGN PATENT DOCUMENTS

| | | | |
|---|---|---|---|
| WO | WO-2009045679 A1 | 4/2009 | |
| WO | WO-2009143139 A2 | 11/2009 | |

OTHER PUBLICATIONS

"U.S. Appl. No. 11/864,714, Final Office Action mailed Aug. 5, 2011", 17 pgs.

(Continued)

*Primary Examiner* — Kavita Padmanabhan
*Assistant Examiner* — Ariel Mercado
(74) *Attorney, Agent, or Firm* — Shook, Hardy & Bacon L.L.P.

(57) ABSTRACT

Various embodiments described herein provide one or more systems, methods, software, and data structures for the presentation of files packaged within a page description language document, such as a Portable Document format ("PDF") document. Some embodiments include a packaged file presentation shell that may be instantiated within a user interface of a page description language reader application and then modified by a presentation overlay. Such as presentation overlay typically includes at least one standardized graphical element, which, when applied to the packaged file presentation shell, overrides respective standardized graphical element properties and presentation nodes.

19 Claims, 5 Drawing Sheets

(56) References Cited

U.S. PATENT DOCUMENTS

| | | |
|---|---|---|
| 2002/0147735 A1 | 10/2002 | Nir |
| 2003/0066027 A1 | 4/2003 | Nakagiri |
| 2003/0196120 A1 | 10/2003 | Raley et al. |
| 2004/0004636 A1 | 1/2004 | van Driel |
| 2004/0205633 A1 | 10/2004 | Martinez et al. |
| 2004/0210535 A1 | 10/2004 | Erickson |
| 2004/0215657 A1 | 10/2004 | Drucker et al. |
| 2005/0177389 A1 | 8/2005 | Rakowicz |
| 2005/0209955 A1 | 9/2005 | Underwood et al. |
| 2005/0268217 A1 | 12/2005 | Garrison |
| 2006/0156228 A1 | 7/2006 | Gallo et al. |
| 2006/0161863 A1 | 7/2006 | Gallo |
| 2006/0206807 A1 | 9/2006 | Rosner et al. |
| 2006/0291504 A1 | 12/2006 | Cohn |
| 2007/0016546 A1 | 1/2007 | De Vorchik et al. |
| 2007/0162953 A1* | 7/2007 | Bolliger et al. ............... 715/700 |
| 2007/0204211 A1 | 8/2007 | Paxson |
| 2007/0226204 A1 | 9/2007 | Feldman |
| 2007/0240079 A1 | 10/2007 | Flynt et al. |
| 2008/0034381 A1 | 2/2008 | Jalon et al. |
| 2009/0089656 A1 | 4/2009 | McAfee et al. |
| 2009/0217173 A1 | 8/2009 | Manheimer |
| 2009/0292980 A1 | 11/2009 | Swineford et al. |
| 2010/0057884 A1 | 3/2010 | Brownell et al. |
| 2010/0306283 A1 | 12/2010 | Johnson et al. |

OTHER PUBLICATIONS

"U.S. Appl. No. 11/864,714, Response filed May 16, 2011 to Non-Final Office Action mailed Feb. 16, 2011", 9 pgs.
"U.S. Appl. No. 11/864,694, Non-Final Office Action mailed Feb. 17, 2011", 21 pgs.
"U.S. Appl. No. 11/864,714, Non-Final Office Action mailed Feb. 16, 2011", 20 pgs.
"U.S. Appl. No. 12/123,624, Non-Final Office Action mailed Dec. 7, 2010", 16 pgs.
"U.S. Appl. No. 12/123,624, Response filed Mar. 7, 2011 to Non-Final Office Action mailed Dec. 7, 2010", 8 pgs.
"International Application Serial No. PCT/US2008/075388, Search Report mailed Jan. 13, 2009", 7 pgs.
"International Application Serial No. PCT/US2008/075388, Written Opinion mailed Jan. 13, 2009", 7 pgs.
"International Application Serial No. PCT/US2009/044496, Search Report mailed Jun. 3, 2010", 4 pgs.
"International Application Serial No. PCT/US2009/044496, Written Opinion mailed Jun. 3, 2010", 6 pgs.
"Open Packaging Format (OPDF) 2.0 v0.984", [Online]. Retrieved from the Internet: <URL:http://www.idpf.org/2007/opf/OPF_2.0_0.984_draft.html>, (Apr. 16, 2007), 35 pages.
"POD Tech Combine PDF's", Adobe Acrobat 8 Packages: Combine PDFs | PodTech.net, [Online] Retrieved from the internet: Apr. 15, 2008 <URL:http://www.podtech.net/home/1761/adobe-acrobat-8-packages-combine-pdfs>, (Dec. 29, 2006), 2 pages.

"Specifications for the Digital Talking Book", Navigation Control File (NCX), [Online]. Retrieved from the Internet: <URL: http://www.niso.org/workrooms/daisy/Z39-86-2005.pdf>, (Apr. 21, 2005), 43-56.
Del Strother, Jonathan, et al., "Cover Flow", From Wikipedia, the free encyclopedia (Redirected from Cover flow), [Online] Retrieved from the internet: May 15, 2008 <URL:http://en.wikipedia.org/wiki/Cover_flow>, (Sep. 11, 2006), 2 pages.
Graham, Jamey, et al., "iCandy: a Tangible User Interface for iTunes", Copyright is held by the author/owner(s). CHI 2008, Apr. 5, 2008, Florence, Italy. ACM 978-1-60558-012-8/08/04., (Apr. 5, 2008), 6 pages.
Toub, S, "View Data your Way With Our Manage Preview Handler Framework", MSDN vol. 22 Issue 1., Available from: Computers & Applied Sciences Complete, Ipswich, MA. Accessed Feb. 11, 2011., (Jan. 2007), 52-67.
Zwicky, E D, "Further torture: more testing of backup and archives programs, in: Proceeding of the 17th Annual Large Installation Systems Administration Conference", LISA 2003, San Diego, CA, USA, (Oct. 2003), 7-14.
37 SIGNALS, "Signal vs. Noise", Cover Flow and the scrolling horizontal subnav at the new Apple.com, [Online]. <URL:http://www.37signals.com/svn/posts/464-cover-flow-and-the-scrolling-%20horizontal-subnav-at-the-new-applecom#extended>, (May 15, 2008), 18 pages.
"U.S. Appl. No. 11/864,714, Examiner Interview Summary mailed Nov. 29, 2011", 3 pgs.
"U.S. Appl. No. 11/864,714, Response filed Nov. 9, 2011 to Final Office Action mailed Aug. 5, 2011", 7 pgs.
"U.S. Appl. No. 11/864,714, Non Final Office Action mailed Sep. 20, 2012", 14 pgs.
"CreativSpace image search—finally a cool image search", [Online] May 15, 2008 <URL:http://creativspace.at/>, 1 page.
"Dynamic PageFlip 3.4", [Online] Apr. 15, 2008 <URL:http://www.pageflip.hu/>, 2 pages.
"Great cover version", Apple—iTunes—iTunes Jukebox—Cover Flow, [Online] May 19, 2008 <URL:http://www.apple.com/itunes/jukebox/coverflow.html>, 1 page.
Rice, F, "How to: Manipulate Office Open XML Formats Documents", http://web.archive.org/web/20070105053042/msdn2.microsoft.com/en-us/library/aa982683.aspx, (Dec. 2006), 19 pages.
"Acrobat Multimedia JavaScript Reference, Version: Acrobat 6.0", Adobe Systems Incorporated, (Apr. 2004), 1-125.
"Adobe Presenter 6 User Guide", copyright 2006 Adobe, 1-79.
"U.S. Appl. No. 11/864,714, Appeal Brief filed Jul. 9, 2013", 17 pgs.
"U.S. Appl. No. 11/864,714, Corrected Notice of Allowance mailed Jan. 30, 2014", 6 pgs.
"U.S. Appl. No. 11/864,714, Final Office Action mailed Apr. 17, 2013", 17 pgs.
"U.S. Appl. No. 11/864,714, Notice of Allowance mailed Oct. 24, 2013", 11 pgs.
"U.S. Appl. No. 11/864,714, Response filed Dec. 19, 2012 to Non-Final Office Action mailed Sep. 20, 2012", 7 pgs.

* cited by examiner

```
%PDF-1.X
    1 0 OBJ
        % CALL TO NAVIGATOR/PACKAGED FILE PRESENTATION
        % SHELL FILE AND PRESENTATION OVERLAY
    ENDOBJ 2 0 OBJ
        % PACKAGED SWF FILE WITH NODE META DATA
        % DESCRIBING AND REFERENCING PACKAGED FILES
        % 1, 2, AND 3
    ENDOBJ 3 0 OBJ
        % URI OF PACKAGED FILE 1
    ENDOBJ 4 0 OBJ
        % URI OF PACKAGED FILE 2
    END OBJ 5 0 OBJ
        % PACKAGED FILE 3
    ENDOBJ 6 0 OBJ
        % IMAGE FILE REFERENCED BY THE PACKAGED FILE
        % PRESENTATION SHELL FILE
    ENDOBJ 7 0 OBJ
        % PRESENTATION OVERLAY INCLUDED AS A PACKAGED
        % DOCUMENT OR AS A REFERENCE TO A LOCATION
        % FROM WHICH TO RETREIVE
    ENDOBJ

TRAILER
        % INDEX TO OBJECTS
    END TRAILER

%%EOF
```

PRESENTATION OVERLAYS TO MODIFY PRESENTATIONS OF PACKAGED FILES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011 Adobe Systems, Incorporated. All Rights Reserved.

BACKGROUND

Page description language documents, such as Portable Document Format (PDF) documents, are heavily used for many purposes. The number of purposes continues to grow as page description language specifications are expanded to provide more options for document creation and presentation. One of these options is the ability to package files within a page description language document.

Views of page description language documents including packaged files may be presented through a user interface of a page description language document reading application, such as an application in the Acrobat® family of applications available from Adobe Systems Incorporated of San Jose, Calif. Views of files packaged within a page description language document may be presented according to a graphical specification that defines a layout and other graphical display parameters.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present subject matter may be practiced without these specific details.

Packaged files have typically been presented in page description language ("PDL") documents in simple listings or as links within PDL documents, such as PDF documents. Recent developments have provided interactive ways for document authors to present access to packaged files utilizing graphical specifications. Such graphical specifications present rich descriptions of packaged files to allow a viewer to quickly identify the relevancy of a packaged file for a particular need without opening the packaged file. This has included the ability for PDL document authors to include graphics, audio, moving images, videos, and views of packaged files within a packaged file presentation shell. However, the graphical specifications have offered authors limited abilities for modifying the graphical elements and properties thereof. In many situations, these limited abilities have been an impediment to adoption of the recent advancements in presentation of files packaged in PDL documents. For instance, typical users have had to request development of graphical specifications by developers with abilities to do so. Thus, various embodiments described herein provide mechanisms by which not only developers, but also typical users, can develop and utilize graphical specifications for the presentation of files packaged within a PDL document.

In some embodiments, a package of files may be presented in a user interface using a graphical specification or a custom navigation template, which are referred to herein as packaged file presentation shells. A packaged file presentation shell may include a graphical layout, graphical elements including locations for presentation of descriptive metadata, navigation mechanisms, and the like. Some such embodiments are supported by the creation and visualization of metadata regarding the package of files. For example, the metadata may be automatically determined, such as file type, creation date, length, and so forth, or it may also be user inputted, such as commentary and notes regarding the package as a whole or individual files included therein.

Within packaged file presentation shells, there are a standard set of elements having a standard set of properties. The standard set of elements may be defined within a specification of a PDL document application by an organization utilizing packaged file presentation shells or other entity. Additional functionality becomes possible through standardization of the elements. Various embodiments herein leverage standardization of packaged file presentation shell elements in an object-oriented manner to provide the ability for "skinning" of packaged file presentation shells with a presentation overlay. A presentation overlay generally includes at least one standardized element that matches a standardized element of a packaged file presentation shell. When a presentation overlay is applied to a packaged file presentation shell, each of the at least one standardized elements overrides a respective standardized element within the packaged file presentation shell. For example, a standardized element such as an icon included within a packaged file presentation shell to represent files packaged within PDL document may be overridden by an alternate icon included as a standardized element within a presentation overlay. A presentation overlay may include as few as one standardized element but may also include many standardized elements. In some instances, a presentation overlay may include more standardized elements than a particular packaged file presentation shell includes.

The process of defining a presentation overlay includes defining a data structure that identifies particular standardized elements of at least one packaged file presentation shell and associating graphics, audio, moving images, videos, text, executable scripts, or other content to the particular standardized elements. The process of defining a presentation overlay may include defining a new data structure or modifying an existing data structure created by oneself or by another. The data structure of a presentation overlay may be shared and distributed by itself, with a PDL document, or otherwise. A PDL document including packaged files may then include, or otherwise reference, a packaged file presentation shell and a presentation overlay that will be utilized by a PDL application in presenting a view of the PDL and the files packaged therein. These and further embodiments are illustrated and described herein.

Figure 1:
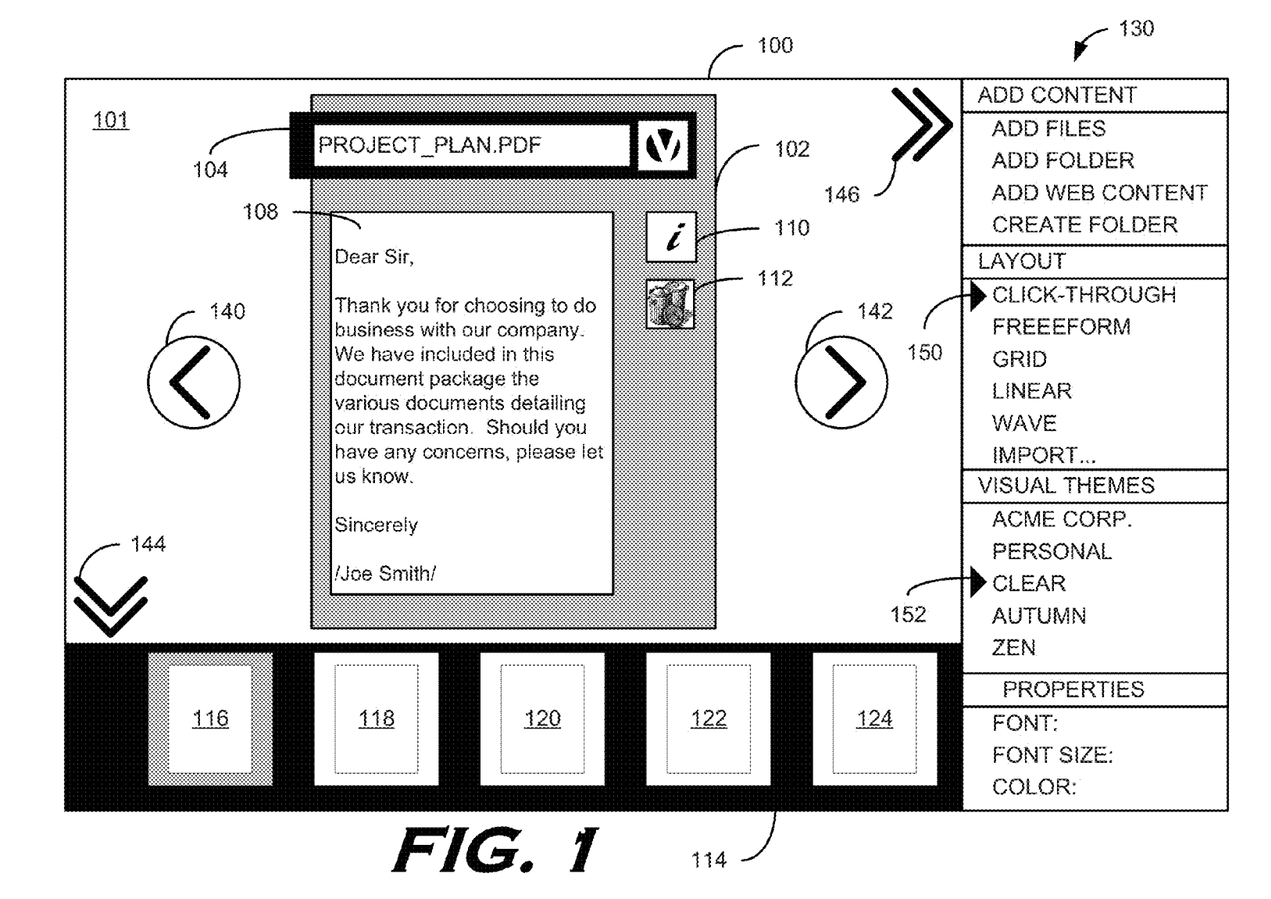
FIG. 1 is a user interface illustration, according to an example embodiment.

FIG. 1 is a user interface 100 illustration, according to an example embodiment. The user interface 100 illustrates a PDL document including five packaged files 116, 118, 120, 122, 124 presented using a packaged file presentation shell. The packaged file presentation shell, when instantiated in the user interface 100 includes a preview pane 101, a packaged file navigator 114, and a packaged file modification menu 130. The PDL document, in some embodiments, is a PDF document.

The preview pane 101 and the packaged file navigator 114 are typically presented according to a layout defined in a packaged file presentation shell. The particular layout as illustrated in the user interface 100 includes a packaged file preview 102 of a packaged file 116 indicated as selected within the packaged file navigator 114. The packaged file preview 102 presents a file name 104 and a preview 108 of the selected packaged file 116. The packaged file preview 102 also includes an information action button 110 and a delete action button 112. The information action button 110, when selected, will cause additional information regarding the selected packaged file 116 to be presented. Such additional information may be metadata associated with the packaged file 116 included within the PDL document. The delete action button 112, when selected, causes the packaged file 116 being previewed to be removed from the PDL document.

The preview pane 101, as illustrated in FIG. 1, also includes navigation elements 140, 142 which may be selected, such as through use of a pointing device, to cause a next packaged file to be presented in the preview pane 101. For example, upon selection of the navigation element 142, the packaged file 118 may be presented in the packaged file preview and the packaged file navigator 114 will be updated to indicate the packaged file 118 is now being previewed. The preview pane 101 may also include elements 144 and 146 which may be selected to cause the packaged file navigator 114 and packaged file modification menu 130 to be hidden from view or displayed. In some embodiments, a creator of the PDL document may secure certain portions of the document to prevent modifications to the PDL document or to restrict how the PDL document may be viewed and utilized. In such embodiments, one or both of the elements 144, 146 may be hidden along with hiding or displaying one or both of the packaged file navigator 114 and the packaged file modification menu 130.

The packaged file modification menu 130 includes menu items that may be selected to modify the PDL document including the packaged files 116, 118, 120, 122, 124. This may include adding content such as files, folders, web content by reference to a Universal Resource Identifier (URI), or other action to cause a file or file folder to be added to the PDL document.

The packaged file modification menu 130 also typically includes menu items to allow modification of a layout within the user interface 100. Selection of a different layout is typically from a list of different layouts defined within packaged file presentation shells. The layouts that may be selected are typically packaged file presentation shells included as data within one or more of a PDL document being viewed, data present on computing device providing a view of the user interface 100, and data that may be imported from other sources. Selection of a different layout will cause the layout of the preview pane 101 and packaged file navigator 114 to be updated to conform to the packaged file presentation shell of the selected layout. A presently selected layout is signified by an indicator 150 within the packaged file modification menu 130. For example, the currently selected layout is named "CLICK-THROUGH."

The packaged file modification menu 130 also provides menu items that may be selected to change a visual theme, or presentation overlay, used to present the view of the PDL document within the user interface 100. A presently selected visual theme is signified by an indicator 152 within the packaged file modification menu 130. For example, the currently selected visual theme is named "CLEAR." Selection of the "CLEAR" visual theme causes a corresponding presentation overlay to be applied to the currently selected layout "CLICK-THROUGH." Selection of a different visual them, such as "ACME CORP" will cause the corresponding presentation overlay to be applied to the same currently selected layout "CLICK-THROUGH." An illustration of the result is presented in FIG. 2.

Figure 2:
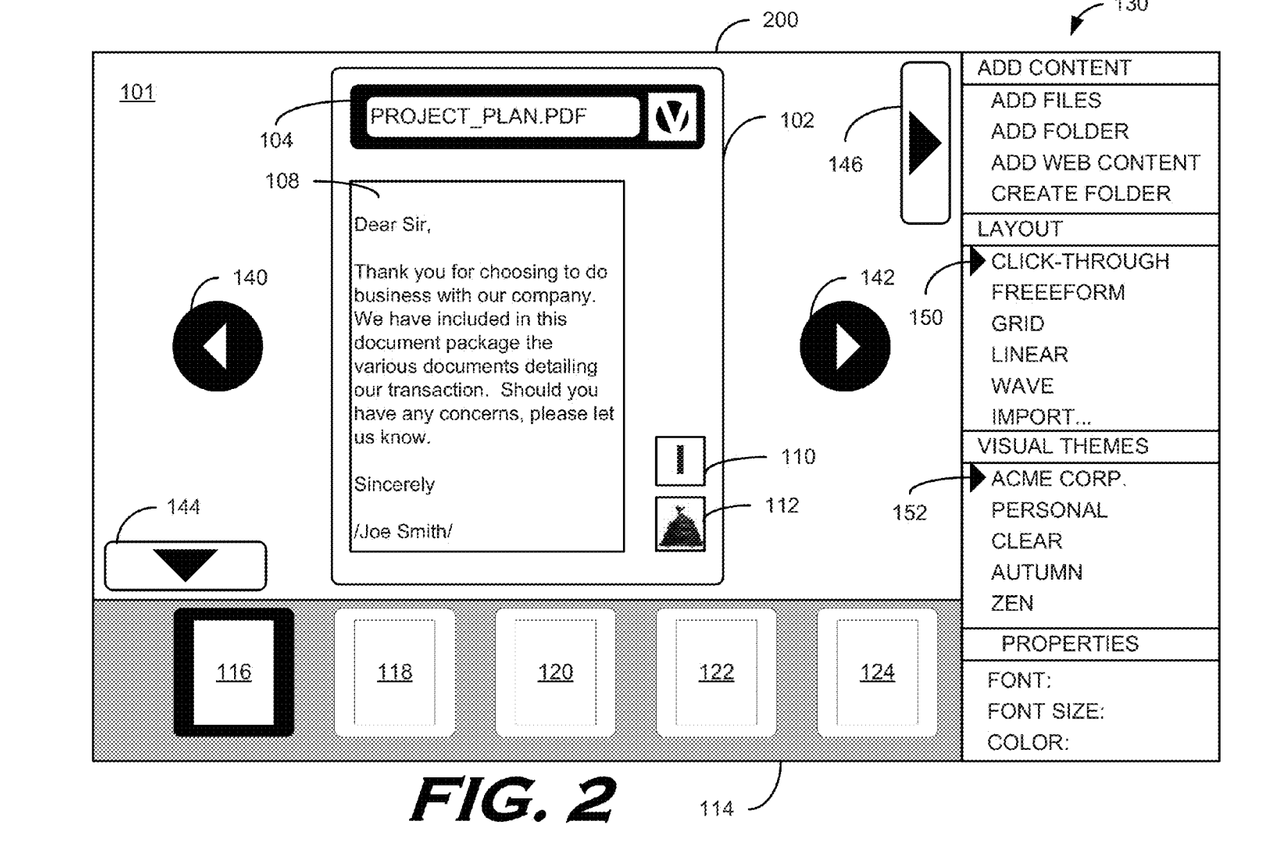
FIG. 2 is a user interface illustration, according to an example embodiment.

FIG. 2 is a user interface 200 illustration, according to an example embodiment. The user interface 200 is the same as user interface 100 of FIG. 1, except it has had a different presentation overlay applied. Application of the different presentation overlay has overridden different properties of the package file presentation shell than that of the presentation overlay applied to the user interface 100 of FIG. 1. This has caused the action buttons 110, 112 to be repositioned; different graphical elements for presentation of navigation elements 140, 142 and elements 144, 146 to be provided; among other modifications. Despite the change in appearance of the user interface 200 from the user interface 100, selection and application of the different presentation overly typically does not change the data of the underlying PDL document. Instead, the act of presenting the PDL document by a PDL document application is modified.

Figure 3:
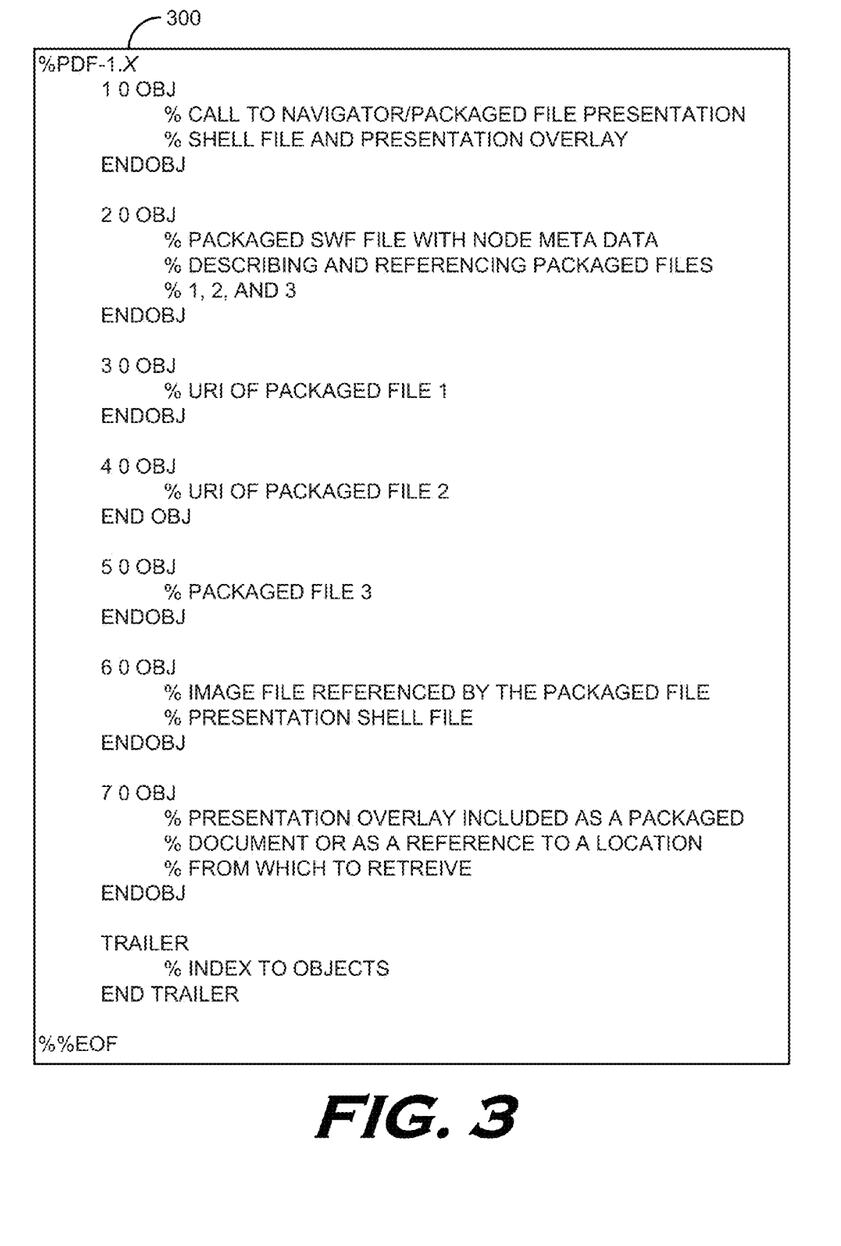
FIG. 3 is a pseudo code listing of a page description language document, according to an example embodiment.

FIG. 3 is a pseudo code listing 300 of a PDL document, according to an example embodiment. The PDL document, in this embodiment, includes six packaged files. The six packaged files include a packaged file presentation shell in 2.0 OBJ; packaged files 1, 2, and 3; an image file in 6.0 OBJ that is referenced in the packaged file presentation shell; and, in the 7.0 OBJ, a presentation overlay or a reference to a location or address from which the presentation overlay may be retrieved. The pseudo code listing 300 includes a call to a packaged file presentation shell. In some embodiments, when a PDL document includes a packaged file presentation shell, the packaged file presentation shell is instantiated upon opening the PDL document followed by application of the presentation overlay. While the pseudo code listing 300 includes only a single packaged file presentation shell and a single presentation overlay, more than one packaged file presentation shell and presentation overlay may be included.

Figure 4:
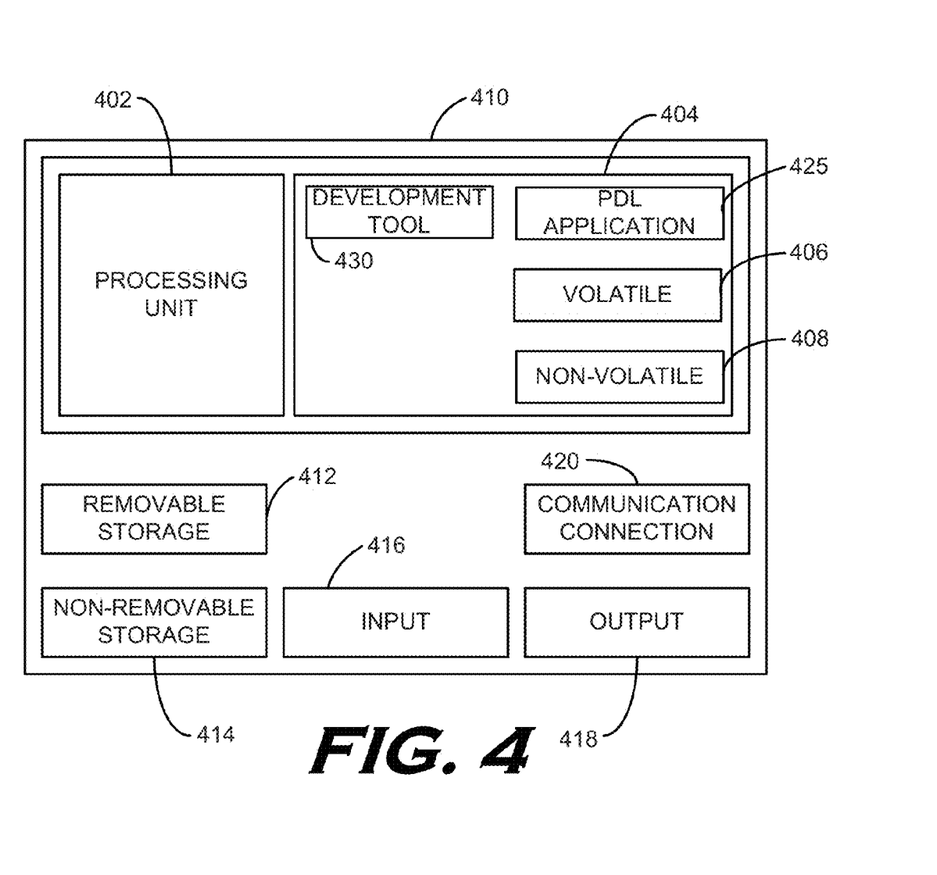
FIG. 4 is a block diagram of a computing device, according to an example embodiment.

FIG. 4 is a block diagram of a computing device, according to an example embodiment. One example computing device in the form of a computer 410 may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using the communication connection 420 to connect to one or more remote computers, such as database servers. The remote computer may include a personal computer (PC), server, router, network PC, a peer device or other common network node, or the like. The communication connection may include a Local Area Network ("LAN"), a Wide Area Network ("WAN"), the Internet, or other networks.

Computer-readable instructions stored on a computer-readable medium are executable by the processing unit 402 of the computer 410. A hard drive, CD-ROM, and RAM are some examples of articles including a computer-readable medium. The computer readable instructions typically include an operating system and a PDL application 425, which may also include the ability to write PDL documents. The computer readable instructions may also include one or more applications, which may be used to create and open files packaged within PDL documents, and a development tool 430, which may be used to create packaged file presentation shells.

An example of the PDL application 425 is a program from the ADOBE® ACROBAT® family of programs available from ADOBE SYSTEMS INCORPORATED of San Jose, Calif. An example of the development tool 430 is the ADOBE® FLEX™ program that is also available from ADOBE SYSTEMS INCORPORATED. The FLEX™ program is a cross-platform development tool and framework for creating rich applications. FLEX™ may be used to create packaged file presentation shells. An example of a design tool that maybe used is a program from the ADOBE® FLASH™ family of programs also available from ADOBE SYSTEMS INCORPORATED, such as the ADOBE® FLASH™ PROFESSIONAL program. The ADOBE® FLASH™ family of programs provide a multimedia authoring platform to generate animations, video, and interactive content that may be consumed within an application plug-in or other application that is enabled to consume such generated content.

In typical embodiments, the computer 410 includes a PDL document including one or more packaged files. The PDL document may be stored in storage 412, 414 held in memory 404, downloaded over the communication connection 420, created using the PDL application 425, or created, stored, or received via another means. The PDL document, in some embodiments may include a packaged file presentation shell including standardized elements that include a presentation node for each of the one or more packaged files. In some such embodiments, the PDL application 425 is operable to present a view of at least a portion the PDL document as a function of the metadata and the packaged file presentation shell. The packaged file presentation shell, when instantiated within a user interface of the PDL application 425, may be responsive to actions of a user. The actions of a user may include gestures made within the user interface with a pointing device. The packaged file presentation shell, in response to a user action, may cause one or more packaged file representations to be displayed. Such a packaged file representation typically includes at least a portion of the associated metadata describing a packaged file.

The PDL document also includes at least one presentation overlay. The presentation overlay typically includes at least one standardized element, which when applied to the packaged file presentation shell by the PDL application 425, overrides respective standardized element properties and presentation nodes.

In some embodiments, the PDL application 425 includes one or more default packaged file presentation shells and presentation overlays capable of displaying at least a portion of the metadata of any PDL document including one or more packaged files. For example, a default packaged file presentation shell, when selected by a user, such as through a menu option, may display data selected from metadata including file name, file size, and a last saved date of each file packaged within a PDL document. A presentation overlay may be applied to the default packaged file presentation shell which will then modify the appearance of how the data is displayed.

In some embodiments, a package file presentation shell, when instantiated within the PDL application 425, or a presentation overlay when applied, may invoke one or more methods of a system plug-in operable within the PDL application 425. In some embodiments, the plug-in may be the FLASH® Player plug-in also available from ADOBE SYSTEMS INCORPORATED.

Figure 5:
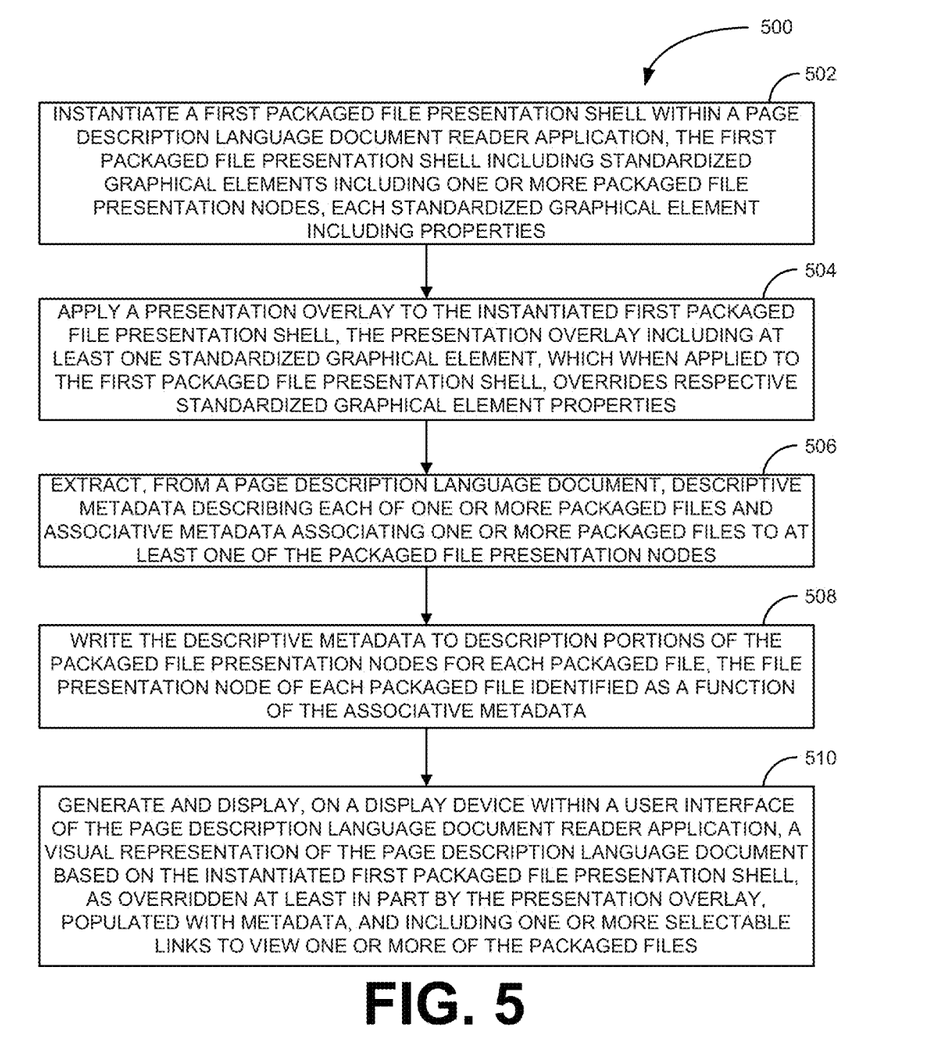
FIG. 5 is a block flow diagram of a method, according to an example embodiment.

FIG. 5 is a block flow diagram of a method, according to an example embodiment. The method 500 is an example of a method of applying a presentation overlay upon a presentation of packaged files included within a PDL document. The method 500 includes instantiating 502 a first packaged file presentation shell within a PDL document application. The first packaged file presentation shell in such embodiments typically includes standardized graphical elements including one or more packaged file presentation nodes, and each standardized graphical element includes properties. The presentation nodes are elements typically utilized within a packaged file presentation shell to represent packaged files included in a PDL document.

The method 500 further includes applying 504 a presentation overlay to the instantiated first packaged file presentation shell. The presentation overlay includes at least one standardized graphical element, which when applied to the first packaged file presentation shell, overrides respective standardized graphical element properties. The method 500 may then extract 506, from a PDL document, descriptive metadata describing each of one or more packaged files and associative metadata associating one or more packaged files to at least one of the packaged file presentation nodes. The method 500 may then write 508 the descriptive metadata to description portions of the packaged file presentation nodes for each packaged file, with the file presentation node of each packaged file identified as a function of the associative metadata.

In some embodiments, the method 500 additionally generates and displays 510 a visual representation of the PDL document based on the instantiated first packaged file presentation shell, as overridden at least in part by the presentation overlay, populated with metadata, and including one or more selectable links to view one or more of the packaged files. An example of such a visual representation is illustrated and described above with regard to FIG. 3.

Returning to the method 500, the method 500 may further include receiving selection input into the user interface of the PDL document application selecting a second packaged file presentation shell. The second packaged file presentation shell will include the standardized graphical elements including the one or more packaged file presentation nodes. However, the second packaged file presentation shell typically provides a layout of presentation nodes different from a layout of presentation nodes within the first packaged file presentation shell. The method 500 in such embodiments may then replace, in the instantiated instance, the first packaged file presentation shell with the second packaged file presentation shell and apply the presentation overlay to the second packaged file presentation shell. Such embodiments further include updating the presented visual representation of the PDL document within the user interface of the PDL document application.

In some embodiments, the at least one of the first packaged file presentation shell and the presentation overlay are included within the PDL document. In other embodiments, the at least one of the first packaged file presentation shell and the presentation overlay are referenced in the metadata of the PDL document by a URI identifying a location from which they are retrievable.

In some embodiments of the method 500, at least one graphical element of the presentation overlay, when applied, invokes one or more methods of an application plug-in executable on the at least one processor to be operable within the PDL document application.

In further embodiments, the presentation overlay may include a script associated with a first standardized graphical element. The script in such embodiments may be invoked upon an action, such as upon application of the presentation overlay to the packaged file presentation shell or upon a pointer hover event. The script, when invoked, may execute within a scripting environment of the PDL application.

Some embodiments of the method may also include receiving selection input into the user interface of the PDL document application, selecting an alternate presentation overlay. Such embodiments may then apply the alternate presentation overlay to the instantiated first packaged file presentation shell. The method may then involve updating the presented visual representation of the PDL document within the user interface of the PDL document application to reflect the newly applied alternate presentation overlay.

Another example embodiment is in the form of a system. The system of such embodiments includes at least one processor and at least one memory device. The at least one memory device may store a PDL document including at least one packaged file, at least one packaged file presentation shell, metadata, and at least one presentation overlay. The at least one packaged file presentation shell may include a graphical layout of standardized graphical elements having properties and presentation nodes for presenting representations of packaged files included in the PDL document. The metadata generally describes each of the at least one packaged files, defines a node for each of the at least one packaged files, and associates each of the defined nodes to presentation nodes within the at least one packaged file presentation shell. Each of the at least one presentation overlays may include at least one standardized graphical element, which when applied to the packaged file presentation shell, overrides respective standardized graphical element properties and presentation nodes.

The at least one memory device of such embodiments also stores a PDL document application that is executable on the at least one processor. The PDL document application is executable to present a view of at least a portion of the PDL document as described in the metadata and according to the at least one packaged file presentation shell graphical layout of the standardized graphical elements and properties and presentation nodes thereof. The PDL document application is further executable to modify the presented view of the at least a portion of the PDL document according to the at least one presentation overlay.

The PDL document application, in some embodiments, is also executable to receive input defining the at least one presentation overlay. The input received may include input selecting data consumed by a PDL document application in rendering a view of a PDL document, such as font, font size, color, images, icons, audio content, and other data. The selected data may also be associated with various elements of a presentation overlay, such as a header, a background, a node for presenting a representation of a packaged file, and other elements.

Example embodiments as described herein may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" or "inventive subject matter" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-system comprising:
a page description language document, including at least one packaged file therein, stored in at least one memory device, the page description language document including: at least one packaged file presentation shell including a graphical layout of standardized graphical elements having properties and presentation nodes for presenting representations of the at least one packaged file of the page description language document;
metadata associating each of the at least one packaged files with a presentation node of the at least one packaged file presentation shell;
at least one presentation overlay including at least one standardized graphical element, which, when applied to the packaged file presentation shell, overrides respective standardized graphical element properties and presentation nodes for presenting representations of the at least one packaged file of the page description language document; and
a page description language document application stored in the at least one memory device and executable on at least one processor to present a view of at least a portion of the page description language document according to the metadata and the at least one packaged file presentation shell as modified by the at least one presentation overlay, wherein the at least one presentation overlay modifies only the packaged file presentation shell when the at least the portion of the page description language document is presented.

2. The system of claim 1, wherein the page description language document application is further executable on the at least one processor to: receive input defining the at least one presentation overlay.

3. The system of claim 1, wherein at least one graphical element of the at least one presentation overlay, when instantiated by the page description language document application, invokes one or more methods of an application plug-in executable on the at least one processor to be operable within the page description language document application.

4. The system of claim 1, wherein the at least one packaged file presentation shell includes an image associated with a first standardized graphical element to display as a representation of a presentation node.

5. The system of claim 4, wherein the at least one presentation overlay includes a script associated with the first standardized graphical element, wherein the presentation overlay, when applied to the at least one packaged file presentation shell, overrides the image associated with the first standardized graphical element included in the packaged file presentation shell and causes the script to execute within a scripting environment of the page description language application.

6. The system of claim 5, wherein the script includes a Universal Resource Identifier of a graphic element to retrieve.

7. The system of claim 1, wherein the standardized graphical elements include a header element, at least one node element, and a background element.

8. A method comprising:
in at least one memory device, instantiating a first packaged file presentation shell of a page description language document within a page description language document application executing on at least one processor of a computing device, the first packaged file presentation shell including standardized graphical elements including one or more packaged file presentation nodes, each standardized graphical element including properties;
applying a presentation overlay to the instantiated first packaged file presentation shell, the presentation overlay including at least one standardized graphical element, which, when applied to the first packaged file presentation shell, overrides respective standardized graphical element properties including respective packaged file presentation nodes that each represent a packaged file within the page description language document; and
presenting, via the page description language document application, a view of at least a portion of the page description language document according to (1) metadata associating each packaged file with the respective packaged file presentation node of the first packaged file presentation shell, and (2) the first packaged file presentation shell as modified by the presentation overlay, wherein the presentation overlay modifies only the first packaged file presentation shell when the at least the portion of the page description language document is presented.

9. The method of claim 8, further comprising:
receiving selection input into a user interface of the page description language document application selecting a second packaged file presentation shell, the second packaged file presentation shell including standardized graphical elements including the one or more packaged file presentation nodes, the second packaged file presentation shell providing a layout of presentation nodes different from a layout of presentation nodes within the first packaged file presentation shell;

replacing the first packaged file presentation shell with the second packaged file
presentation shell and applying the presentation overlay to the second packaged file presentation shell.

10. The method of claim 8, wherein at least one of the first packaged file presentation shell and the presentation overlay are included within the page description language document.

11. The method of claim 8, wherein at least one of the first packaged file presentation shell and the presentation overlay are referenced in metadata of the page description language document by a Universal Resource Identifier identifying a location from which they are retrievable.

12. The method of claim 8, wherein at least one graphical element of the presentation overlay, which when applied, invokes one or more methods of an application plug-in executable on the at least one processor to be operable within the page description language document application.

13. The method of claim 8, wherein the first packaged file presentation shell includes an image associated with a first standardized graphical element to display as a representation of a presentation node.

14. The method of claim 13, wherein the presentation overlay includes a script associated with the first standardized graphical element, wherein the presentation overlay, when applied to the first packaged file presentation shell, overrides the image associated with the first standardized graphical element included in the first packaged file presentation shell and causes the script to execute within a scripting environment of the page description language application.

15. The method of claim 8, further comprising:
receiving selection input into the user interface of the page description language document application selecting an alternate presentation overlay;
applying the alternate presentation overlay to the instantiated first packaged file presentation shell, the alternate presentation overlay including at least one standardized graphical element, which when applied to the first packaged file presentation shell, overrides respective standardized graphical element properties; and
wherein the applying the alternate presentation overlay to the instantiated first packaged file presentation shell modifies a visible presentation of the page description language document without modifying stored data of the page description language document.

16. A non-transitory computer-readable medium, with instructions stored thereon, which when executed by at least one processor cause a computing device to:
instantiate a first packaged file presentation shell of a page description language document within a page description language document application, the first packaged file presentation shell including standardized graphical elements including one or more packaged file presentation nodes, each standardized graphical element including properties;
apply a presentation overlay to the instantiated first packaged file presentation shell, the presentation overlay including at least one standardized graphical element, which, when applied to the first packaged file presentation shell, overrides respective standardized graphical element properties including respective packaged file presentation nodes that each represent a packaged file within the page description language document; and
present, via the page description language document application, a view of at least a portion of the page description language document according to (1) metadata associating each packaged file with the respective packaged file presentation node of the first packaged file presentation shell, and (2) the first packaged file presentation shell as modified by the presentation overlay, wherein the presentation overlay modifies only the first packaged file presentation shell when the at least the portion of the page description language document is presented.

17. The non-transitory computer-readable medium of claim 16, with further instructions stored thereon, which when executed by the at least one processor cause the computing device to:
receive selection input into a user interface of the page description language document application selecting a second packaged file presentation shell, the second packaged file presentation shell including standardized graphical elements including the one or more packaged file presentation nodes, the second packaged file presentation shell providing a layout of presentation nodes different from a layout of presentation nodes within the first packaged file presentation shell;
replace the first packaged file presentation shell with the second packaged file presentation shell and apply the presentation overlay to the second packaged file presentation.

18. The non-transitory computer-readable medium of claim 16, wherein at least one graphical element of the presentation overlay, which when applied, invokes one or more methods of an application plug-in executable on the at least one processor to be operable within the page description language document application.

19. The non-transitory computer-readable medium of claim 16, with further instructions stored thereon, which when executed by the at least one processor cause the computing device to:
receive selection input into a user interface of the page description language document application selecting an alternate presentation overlay;
apply the alternate presentation overlay to the instantiated first packaged file presentation shell, the alternate presentation overlay including one or more standardized graphical elements, which when applied to the first packaged file presentation shell, overrides respective standardized graphical element properties; and
wherein the applying the alternate presentation overlay to the instantiated first packaged file presentation shell modifies a visible presentation of the page description language document without modifying stored data of the page description language document.

* * * * *